United States Patent
Wright

(10) Patent No.: US 8,607,340 B2
(45) Date of Patent: *Dec. 10, 2013

(54) HOST INTRUSION PREVENTION SYSTEM USING SOFTWARE AND USER BEHAVIOR ANALYSIS

(75) Inventor: Clifford C. Wright, Oxfordshire (GB)

(73) Assignee: Sophos Limited, Abingdon (GB)

( * ) Notice: Subject to any disclaimer, the term of this patent is extended or adjusted under 35 U.S.C. 154(b) by 665 days.

This patent is subject to a terminal disclaimer.

(21) Appl. No.: 12/750,840

(22) Filed: Mar. 31, 2010

(65) Prior Publication Data

US 2011/0023115 A1    Jan. 27, 2011

Related U.S. Application Data

(63) Continuation-in-part of application No. 12/506,749, filed on Jul. 21, 2009.

(51) Int. Cl.
*G06F 11/00* (2006.01)

(52) U.S. Cl.
USPC .................................. 726/22; 726/23; 726/24

(58) Field of Classification Search
USPC ....................................... 726/22–25; 713/188
See application file for complete search history.

(56) References Cited

U.S. PATENT DOCUMENTS

| | | | | |
|---|---|---|---|---|
| 6,405,318 | B1 * | 6/2002 | Rowland | 726/22 |
| 6,775,780 | B1 * | 8/2004 | Muttik | 726/24 |
| 7,360,249 | B1 * | 4/2008 | Szor et al. | 726/22 |
| 7,464,158 | B2 * | 12/2008 | Albornoz | 709/224 |
| 7,620,983 | B1 * | 11/2009 | Satish | 726/22 |
| 7,917,955 | B1 * | 3/2011 | Spurlock et al. | 726/24 |
| 8,079,085 | B1 * | 12/2011 | Wu et al. | 726/24 |
| 2003/0177394 | A1 * | 9/2003 | Dozortsev | 713/201 |
| 2005/0188272 | A1 * | 8/2005 | Bodorin et al. | 714/38 |
| 2006/0075501 | A1 | 4/2006 | Thomas et al. | |
| 2006/0075504 | A1 * | 4/2006 | Liu | 726/25 |
| 2007/0240217 | A1 | 10/2007 | Tuvell et al. | |
| 2008/0127336 | A1 * | 5/2008 | Sun et al. | 726/22 |
| 2008/0148407 | A1 | 6/2008 | Katkar et al. | |
| 2009/0049549 | A1 | 2/2009 | Park et al. | |
| 2009/0089878 | A1 | 4/2009 | Monastyrsky et al. | |
| 2009/0126021 | A1 * | 5/2009 | Albornoz | 726/23 |
| 2009/0187992 | A1 * | 7/2009 | Poston | 726/24 |
| 2009/0313699 | A1 | 12/2009 | Jang et al. | |
| 2010/0212010 | A1 * | 8/2010 | Stringer et al. | 726/22 |
| 2010/0251363 | A1 * | 9/2010 | Todorovic | 726/22 |
| 2010/0299292 | A1 * | 11/2010 | Collazo | 706/14 |
| 2011/0023118 | A1 | 1/2011 | Wright | |

OTHER PUBLICATIONS

U.S. Appl. No. 12/506,749, Non-Final Office Action mailed Dec. 21, 2011, , 11.

U.S. Appl. No. 12/506,749, Final Office Action mailed Sep. 19, 2012, , 13.

U.S. Appl. No. 12/506,749, Non-Final Office Action mailed Mar. 28, 2013, 14 pages.

\* cited by examiner

*Primary Examiner* — Nirav B Patel

(74) *Attorney, Agent, or Firm* — Strategic Patents, P.C.

(57) ABSTRACT

In embodiments of the present invention improved capabilities are described for threat detection using a behavioral-based host-intrusion prevention method and system for monitoring a user interaction with a computer, software application, operating system, graphic user interface, or some other component or client of a computer network, and performing an action to protect the computer network based at least in part on the user interaction and a computer code process executing during or in association with a computer usage session.

19 Claims, 5 Drawing Sheets

HOST INTRUSION PREVENTION SYSTEM USING SOFTWARE AND USER BEHAVIOR ANALYSIS

CROSS-REFERENCE TO RELATED APPLICATIONS

This application is a continuation-in-part of the following commonly owned U.S. patent application Ser. No. 12/506,749 filed on Jul. 21, 2009 and entitled "BEHAVIORAL-BASED HOST INTRUSION PREVENTION SYSTEM," which is incorporated herein by reference in its entirety.

BACKGROUND

1. Field

The present invention is related to behavioral-based threat detection.

2. Description of the Related Art

There exists within the art of anti-malware many methods for inspection of run time behaviors of applications, executables and processes. Based upon the behaviors of said objects, policy decisions can be made about the legitimacy of the application and execution halted and changes reversed to prevent damage, unauthorized access and so on. Behavioral inspection is used as a means of malware detection due to the increasing propensity for malware authors to obfuscate and randomize content, making conventional deterministic content-based analysis mechanisms increasingly ineffective. Existing behavioral monitoring systems have been with a database of actions and resources that are blacklisted and indicate malicious intent. During run time, if a given process, application or executable (perhaps being manipulated while the content of the executable itself is legitimate or where interpreting malicious data causes unintended and malicious behavior in a legitimate entity) performs any one of the actions in the list of negative actions the process may be identified as malicious and terminated or the administrator alerted. To avoid false positives, these existing implementations may also have exception lists for rules based on known processes and behaviors.

Behavioral inspection is already a corner stone of modern malware protection; however these implementations are limited in their ability to remediate and to differentiate between minor events and definitive malicious activity exhibited by a known class of malware. This makes driving simple remediation challenging as the process can be killed, but any other potential files and alike remain untouched (and unassociated with the event).

SUMMARY

In embodiments of the present invention, a behavioral-based host-intrusion prevention method and system may be used for monitoring a user interaction with a computer, software application, operating system, graphic user interface, or some other component of a computer (e.g. a client) within a computer network, and performing an action to protect the computer and/or computer network based at least in part on the user interaction. Such protection may be provided based at least in part by monitoring a user interaction with a computer, and/or computer network client device, during a usage session for an indication of a user behavior and monitoring a computer code process executing during the usage session for an indication of a code operation. The indication of the user behavior may be a result of comparing the user interaction, or plurality of user interactions, with a predetermined behavior (hereinafter, a "behavioral gene"). For example, markers of user behaviors with a computer or client device of a computer network may be monitored, recorded, stored, classified, and/or analyzed based at least in part on the indicia of behavior, or data relating to the behavior, that are created by the user behavior. For example, a user clicking on a link may be detected, recorded, stored, classified, and/or analyzed. Other sample behaviors may include, but are not limited to, a user scrolling down a page, opening or closing a window, clicking on a link on a webpage, downloading a file, saving a file, running a file, typing a keyword, or some other user interaction. For each of the user behaviors occurring within the computer network, or derived from behaviors recorded from interaction with another computer network, a behavioral gene may be stored in a database that is associated with the computer network in which the data relating to the user behavior is recorded and stored. For example, a behavioral gene called "Internet download" may be created and stored in association with the computer network. This behavioral gene may summarize the user behaviors of 1) executing a hyperlink on the Internet, and 2) performing a "save as" action in which a file is saved to a location in the computer network, such as a hard drive. A single user behavior (e.g., closing an application) may be recorded and stored as a behavioral gene. Alternatively, a plurality of user behaviors may be recorded within a single behavioral gene. The user behaviors embodied in a behavioral gene may be derived from a user's single usage session, for example, one instance of running an Internet browser, or may be derived from multiple usage sessions that are temporally distinct, such as a first usage session in which an Internet browser is used, and a second usage session in which a file is opened that was downloaded to the user's hard drive during the first usage session.

In embodiments, the indication of the code operation may be a result of comparing an operation with a predetermined code behavior (hereinafter, a "code gene"). For example, a code gene may be a virus definition, a malware definition, an adware definition, or some other code behavior. The behavioral gene and the code gene may be stored for reference in a database. The monitoring of the computer code process executing during the usage session may be performed one or more times to collect a plurality of code genes. The step of identifying a behavioral gene and code gene may be independent steps. A combination of one or more behavioral genes may be combined with one or more code genes and the combination compared to a predetermined collection of user behavior-code operation indications ("phenotypes"). The phenotypes may comprise a grouping of specific behavioral and code gene combinations that are typically present in a type of malicious usage session or operation with a computer. The identification of a phenotype that is indicative and/or associated with a malicious computer operation may cause an action, such as an intrusion preventive action to occur within the computer network. A phenotype may comprise one behavioral gene and a plurality of code genes, a plurality of behavioral genes and one code gene, or some other combination of behavioral genes and code genes. In some embodiments, a phenotype may comprise a combination of one or more behavioral genes, one or more code genes, including embodiments in which there is a temporal disparity between the identification of the behavioral gene and the identification of the code gene.

In embodiments, the step of causing an action, such as a intrusion prevention action, may include creating an audit record. The creation of an audit record may include updating a log file. In some embodiments, the step of causing an action may include, at least in part, forcing the usage session to occur within a restricted operating environment (e.g. in a sandbox, etc.). In embodiments, the step of causing an action may include, at least in part, preventing a process that would cause a failure, including, but not limited to a computer system failure, a device failure, a network state failure, or some other failure. The step of causing an action may include, at least in part, isolating, via quarantine, the computer on which the user interaction occurs and limiting network access to or from the computer. The step of causing an action may include, at least in part, reverting a computer software state back to a prior state that is known to be acceptable. The step of causing an action may also include, at least in part, disconnecting a device, such as a peripheral, a thumb drive, a zip drive, a disk drive, or some other device.

In embodiments, the user interaction with a computer may include, but is not limited to, executing a link, executing an Internet link, executing an intranet link, downloading a content item from a server, forwarding an URL, forwarding an email, opening an application, closing an application, updating an application, patching an application, bookmarking a website, placing an VoIP call, adding an item to a shopping cart, entering a financial datum in a field, making a purchase, using a webcam, creating an application macro, an application shortcut, entering a novel keystroke combination, remotely accessing a computer, submitting a password, attaching a peripheral device, a temporal measure (e.g., time spent on a page, or time between a first and second user action), a change in a network behavior, a change in a firewall setting, a bridging of two previously unconnected networks, or some other type of user interaction.

In embodiments, a user interaction with a computer may include an indicator of inactivity, such as activation of a screen saver or hibernation process.

In embodiments, a user interaction may occur on a keyboard, a mouse, a display device, a biometric reader, a camera, a scanning device, a printer a telecommunication component, or some other device or client of a computer network. The device or client of the computer network may be remotely associated with the computer network, for example a cell phone that is used to remotely access and interact with the computer network. The methods and systems of the present invention may distinguish between behaviors occurring on remote devices and clients and those behaviors that are occurring on devices local to the computer network, such as wired devices and clients.

In embodiments, indication of a code operation may include, but is not limited to, an automatic code behavior, such as a system startup, login, scheduled job process, system service, or some other type of code operation.

The gene may be at least one of: disables OS tools in a registry, disables a firewall in a registry, adds itself to a firewall authorized applications list in a registry, injects code into an application, copies itself to a system folder, sets a run key to itself in a registry, sets a second run key to itself in a registry in a different location, and opens a hidden file with write access. The gene may be at least one of a system modification and a behavior of process. The phenotype may be a combination of more than one gene.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

While the invention has been described in connection with certain preferred embodiments, other embodiments would be understood by one of ordinary skill in the art and are encompassed herein.

All documents referenced herein are hereby incorporated by reference.

DETAILED DESCRIPTION

Figure 1:
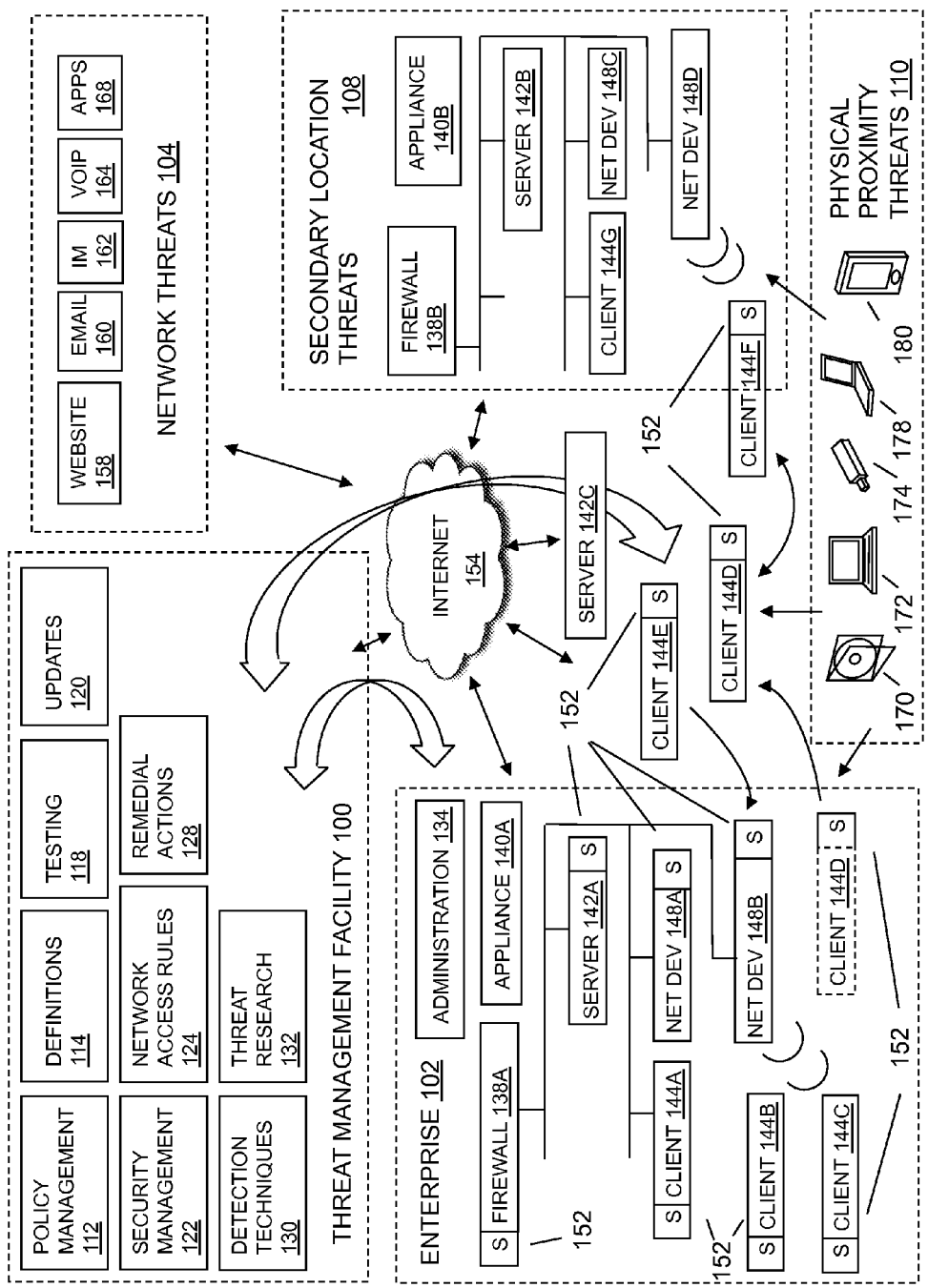
FIG. 1 depicts a block diagram of a threat management facility providing protection to an enterprise against a plurality of threats.

FIG. 1 depicts a block diagram of a threat management facility providing protection to an enterprise against a plurality of threats. An aspect of the present invention relates to corporate policy management and implementation through a unified threat management facility 100. As will be explained in more detail below, a threat management facility 100 is used to protect computer assets from many threats, both computer-generated threats and user-generated threats. The threat management facility 100 is multi-dimensional in that it is designed to protect corporate assets from a variety of threats and it is adapted to learn about threats in one dimension (e.g. worm detection) and apply the knowledge in another dimension (e.g. spam detection). Corporate policy management is one of the dimensions for which the threat management facility can control. The corporation may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services and policy management may be offered as one of the services. We will now turn to a description of the threat management system 100

Over recent years, malware has become a major problem across the internet 154. From both technical and user perspectives, the categorization of a specific threat type, whether as virus, worm, spam, phishing exploration, spyware, adware, or the like, is becoming reduced in significance. The threat, no matter how it's categorized, may need to be stopped at all points of the enterprise facility 102, including laptop, desktop, server facility 142, gateway, and the like. Similarly, there may be less and less benefit to the user in having different solutions for known and unknown threats. As such, a consolidated threat management facility 100 may need to be applied to the same set of technologies and capabilities for all threats.

The threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have lead to a rapid increase in the speed at which threats may move. Today, an unprotected PC connected to the internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include client facility's 144 that have moved into network connectivity not directly associated or controlled by the enterprise facility 102. Threats to enterprise facility 102 client facilities 144 may come from a plurality of sources, such as from network threats 104, physical proximity threats 110, secondary location threats 108, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility 144 computing resource. The security management facility 122 may have the ability to scan the client facility 144 files for malicious code, remove or quarantine certain applications and files, prevent certain actions, perform remedial actions and perform other security measures. In embodiments, scanning the client facility 144 may include scanning some or all of the files stored to the client facility 144 on a periodic basis, may scan applications once the application has been requested to execute, may scan files as the files are transmitted to or from the client facility 144, or the like. The scanning of the applications and files may be to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facilities 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running, whereas runtime protection may only interrupt code that has already partly executed; behavioral protection may identify malicious code at the gateway or on the file servers and deletes it before reaching end-point computers and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities 144. The updates may be a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities 144, or the like. In an embodiment, the management of malicious code information may be provided to the enterprise facility's 102 network, where the enterprise facility's 102 network may provide the malicious code information through the enterprise facility's 102 network distribution system.

The threat management facility 100 may provide a policy management facility 112 that may be able to block non-malicious applications, such as VoIP 164, instant messaging 162, peer-to-peer file-sharing, and the like, that may undermine productivity and network performance within the enterprise facility 102. The policy management facility 112 may be a set of rules or policies that may indicate enterprise facility 102 access permissions for the client facility 144, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility 144. The policy management facility 112 may include rules that may be interpreted with respect to an enterprise facility 102 network access request to determine if the request should be allowed. The rules may provide a generic rule for the type of access that may be granted; the rules may be related to the policies of an enterprise facility 102 for access rights for the enterprise facility's 102 client facility 144. For example, there may be a rule that does not permit access to sporting websites. When a website is requested by the client facility 144, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility 144 access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM 162 activity to only support personnel for communicating with customers. This may allow communication for departments requiring access, but may maintain the network bandwidth for other activities by restricting the use of IM 162 to only the personnel that need access to IM 162 in support of the enterprise facility 102. In an embodiment, the policy management facility 112 may be a stand-alone application, may be part of the network server facility 142, may be part of the enterprise facility 102 network, may be part of the client facility 144, or the like.

In embodiments, the threat management facility 100 may provide configuration management, which may be similar to policy management, but may specifically examine the configuration set of applications, operating systems, hardware, and the like, and managing changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and the update management facility 120 may be provided by the threat management facility 100. In addition, a policy management facility 112 may also require update management (e.g. as provided by the update facility 120 herein described), as the enterprise facility 102 requirements for policies change enterprise facility 102, client facility 144, server facility 142 enterprise facility 102. The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility 144, the enterprise facility 102 network and/or client facility 144 may pull information from the security facility 122 and policy management facility 112 network server facilities 142, there may be a combination of pushing and pulling of information between the security facility 122 and the policy management facility 112 network servers 142, enterprise facility 102 network, and client facilities 144, or the like. For example, the enterprise facility 102 network and/or client facility 144 may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility 144 by providing notification that there are updates available for download and then transmitting the information. The combination of the security management 122 network server facility 142 and security update module may function substantially the same as the policy management facility 112 network server and policy update module by providing information to the enterprise facility 102 network and the client facility 144 in a push or pull method. In an embodiment, the policy management facility 112 and the security facility 122 management update modules may work in concert to provide all the needed information to the enterprise facility's 102 network and/or client facility 144 for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility 144 for the determination of malicious code that may be within the file or application. The definition files may contain a number of commands, definitions, or instructions, to be parsed and acted upon, or the like. In embodiments, the client facility 144 may be updated with new definition files periodically to provide the client facility 144 with the most recent malicious code definitions; the updating may be performed on a set time period, may be updated on demand from the client facility 144, may be updated on demand from the network, may be updated on a received malicious code alert, or the like. In an embodiment, the client facility 144 may request an update to the definition files from an update facility 120 within the network, may request updated definition files from a computing facility external to the network, updated definition files may be provided to the client facility 114 from within the network, definition files may be provided to the client facility 144 from an external computing facility from an external network, or the like.

In an embodiment, a definition management facility 114 may provide for the timely updates of definition files information to the network, client facilities 144, and the like. New and altered malicious code and malicious applications may be continually created and distributed to networks worldwide. The definition files that maintain the definitions of the malicious code and malicious application information for the protection of the networks and client facilities 144 may need continual updating to provide continual defense of the network and client facility 144 from the malicious code and malicious applications. The definition files management may provide for automatic and manual methods of updating the definition files. In embodiments, the network may receive definition files and distribute the definition files to the network client facilities 144, the client facilities 144 may receive the definition files directly, or the network and client facilities 144 may both receive the definition files, or the like. In an embodiment, the definition files may be updated on a fixed periodic basis, on demand by the network and/or the client facility 144, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility 144 having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility 144 application should be granted access to a requested network location. The network location may be on the same network as the facility or may be on another network. In an embodiment, the network access control may verify access rights for client facilities 144 from within the network or may verify access rights of computer facilities from external networks. When network access for a client facility 144 is denied, the network access control may send an information file to the client facility 144, the information file may contain data or commands that may provide instructions for the remedial action facility 128. The information sent by the network access facility 124 control may be a data file. The data file may contain a number of commands, definitions, instructions, or commands to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility 144. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites 158, controlling instant messenger 162 accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility 144 network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility 144, quarantine of the application, terminating the application, isolation of the application, isolation of the client facility 144 to a location within the network that restricts network access, blocking a network access port from a client facility 144, reporting the application to a administration facility 134, or the like.

Remedial action may be provided as a result of a detection of a threat or violation. The detection techniques facility 130 may include monitoring the enterprise facility 102 network or end-point devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility 144, and the like. This may provide the capability of not allowing a streaming file or portions of the streaming file containing malicious code from entering the client facility 144, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility 144, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility 144 computing facilities on a network. The administration facility 134 may be able to send test files to a set of client facility 144 computing facilities to test the ability of the client facility 144 to determine acceptability of the test file. After the test file has been transmitted, a recording facility may record the actions taken by the client facility 144 in reaction to the test file. The recording facility may aggregate the testing information from the client facility 144 and report the testing information to the administration facility 134. The administration facility 134 may be able to determine the level of preparedness of the client facility 144 computing facilities by the reported information. Remedial action may be taken for any of the client facility 144 computing facilities as determined by the administration facility 134; remedial action may be taken by the administration facility 134 or by the user of the client facility 144.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility 144, server facility 142, administration facility 134, firewall 138, gateway, hubs and routers 148, threat management appliance 140, desktop users, mobile users, and the like. In embodiments, it may be the end-point computer security facility 152, located on a computer's desktop, which may provide threat protection to a user, and associated enterprise facility 102. In embodiments, the term end-point may refer to a computer system that may source data, receive data, evaluate data, buffer data, or the like (such as a user's desktop computer as an end-point computer), a firewall as a data evaluation end-point computer system, a laptop as a mobile end-point computer, a PDA as a hand-held end-point computer. In embodiments, end-point may refer to a source or destination for data, including such components where the destination is characterized by an evaluation point for data, and where the data may be sent to a subsequent destination after evaluation. The end-point computer security facility 152 may be an application loaded onto the computer platform or computer support component, where the application may accommodate the plurality of computer platforms and/or functional requirements of the component. For instance, a client facility 144 computer may be one of a plurality of computer platforms, such as Windows, Macintosh, Linux, and the like, where the end-point computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility 144 computing platforms on which the end-point computer security facility 152 is adapted. A client facility 144 computing platform may be a computer system that is able to access a service on another computer, such as a server facility 142, via a network. This client facility 144 server facility 142 model may apply to a plurality of networked applications, such as a client facility 144 connecting to an enterprise facility 102 application server facility 142, a web browser client facility 144 connecting to a web server facility 142, an e-mail client facility 144 retrieving e-mail from an internet 154 service provider's mail storage servers 142, and the like. In embodiments, traditional large client facility 144 applications may be switched to websites, which may increase the browser's role as a client facility 144. Clients 144 may be classified as a function of the extent to which they perform their own processing. For instance, client facilities 144 are sometimes classified as a fat client facility 144 or thin client facility 144. The fat client facility 144, also known as a thick client facility 144 or rich client facility 144, may be a client facility 144 that performs the bulk of data processing operations itself, and does not necessarily rely on the server facility 142. The fat client facility 144 may be most common in the form of a personal computer, where the personal computer may operate independent of any server facility 142. Programming environments for fat clients 144 may include CURL Delphi, Droplets, Java, win32, X11, and the like. Thin clients 144 may offer minimal processing capabilities, for instance, the thin client facility 144 may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility 144 may also be a mix of the two, such as processing data locally, but relying on a server facility 142 for data storage. As a result, this hybrid client facility 144 may provide benefits from both the fat client facility 144 type, such as multimedia support and high performance, and the thin client facility 144 type, such as high manageability and flexibility. In embodiments, the threat management facility 100, and associated end-point computer security facility 152, may provide seamless threat protection to the plurality of clients 144, and client facility 144 types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility 144 connections in order to service requests from clients 144. The server facility 142 application may run on the same computer as the client facility 144 using it, or the server facility 142 and the client facility 144 may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an end-point computer security facility 152. These appliances may provide interconnection services within the enterprise facility 102 network, and therefore may advance the spread of a threat if not properly protected.

One way for a client facility 144 to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an end-point computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network". Since firewall facilities 138 represent boundaries between threat levels, the end-point computer security facility 152 associated with the firewall facility 138 may provide resources that may control the flow of threats at this enterprise facility 102 network entry point. Firewall facilities 138, and associated end-point computer security facility 152, may also be associated with a network node that may be equipped for interfacing between networks that use different protocols. In embodiments, the end-point computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility 144 computers; and the like. In embodiments, the most effective location for threat detection may be at the user's computer desktop end-point computer security facility 152.

The interface between the threat management facility 100 and the enterprise facility 102, and through the appliance facility 140 to embedded end-point computer security facilities, may include a set of tools that may be the same for all enterprise implementations, but allow each enterprise to implement different controls. In embodiments, these controls may include both automatic actions and managed actions. Automatic actions may include downloads of the end-point computer security facility 152 to components of the enterprise facility 102, downloads of updates to existing end-point computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM 162 and VoIP 164; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities 144 within the enterprise facility 102 may be connected to the enterprise facility 102 network by way of wired network facilities 148A or wireless network facilities 148B. Client facilities 144 connected to the enterprise facility 102 network via a wired facility 148A or wireless facility 148B may receive similar protection, as both connection types are ultimately connected to the same enterprise facility 102 network, with the same end-point computer security facility 152, and the same threat protected enterprise facility 102 environment. Mobile wireless facility clients 144B-F, because of their ability to connect to any wireless 148B,D network access point, may connect to the internet 154 outside the enterprise facility 102, and therefore outside the threat-protected environment of the enterprise facility 102. In this instance the mobile client facility 144B-F, if not for the presence of the end-point computer security facility 152 may experience a malware attack or perform actions counter to enterprise facility 102 established policies. In addition, there may be a plurality of ways for the threat management facility 100 to protect the out-of-enterprise facility 102 mobile client facility 144D-F that has an embedded end-point computer security facility 152, such as by providing URI filtering in personal routers, using a web appliance as a DNS proxy, or the like. Mobile client facilities 144D-F that are components of the enterprise facility 102 but temporarily outside connectivity with the enterprise facility 102 network, may be provided with the same threat protection and policy control as client facilities 144 inside the enterprise facility 102. In addition, mobile client facilities 144B-F may receive the same interactions to and from the threat management facility 100 as client facilities 144 inside the enterprise facility 102, where mobile client facilities 144B-F may be considered a virtual extension of the enterprise facility 102, receiving all the same services via their embedded end-point computer security facility 152.

Interactions between the threat management facility 100 and the components of the enterprise facility 102, including mobile client facility 144B-F extensions of the enterprise facility 102, may ultimately be connected through the internet 154. Threat management facility 100 downloads and upgrades to the enterprise facility 102 may be passed from the firewalled networks of the threat management facility 100 through to the end-point computer security facility 152 equipped components of the enterprise facility 102. In turn the end-point computer security facility 152 components of the enterprise facility 102 may upload policy and access requests back across the internet 154 and through to the threat management facility 100. The Internet 154 however, is also the path through which threats may be transmitted from their source. These network threats may include threats from a plurality of sources, including websites 158, e-mail 160, IM 162, VoIP 164, application software, and the like. These threats may attempt to attack a mobile enterprise client facility 144B-F equipped with an end-point computer security facility 152, but in embodiments, as long as the mobile client facility 144B-F is embedded with an end-point computer security facility 152, as described above, threats may have no better success than if the mobile client facility 144B-F were inside the enterprise facility 102.

However, if the mobile client facility 144 were to attempt to connect into an unprotected connection point, such as at a secondary location 108 that is not a part of the enterprise facility 102, the mobile client facility 144 may be required to request network interactions through the threat management facility 100, where contacting the threat management facility 100 may be performed prior to any other network action. In embodiments, the client facility's 144 end-point computer security facility 152 may manage actions in unprotected network environments such as when the client facility 144F is in a secondary location 108 or connecting wirelessly to a non-enterprise facility 102 wireless internet connection, where the end-point computer security facility 152 may dictate what actions are allowed, blocked, modified, or the like. For instance, if the client facility's 144 end-point computer security facility 152 is unable to establish a secured connection to the threat management facility 100, the end-point computer security facility 152 may inform the user of such, and recommend that the connection not be made. In the instance when the user chooses to connect despite the recommendation, the end-point computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the end-point computer security facility 152 may perform specific actions to remediate possible threat incursions or policy violations during or after the unprotected connection.

The secondary location 108 may have no end-point computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities 144. The connection may be made from direct connection with the enterprise facility's 102 client facility 144, such as through a USB port, or in physical proximity with the enterprise facility's 102 client facility 144 such that a wireless facility connection can be established, such as through a Bluetooth connection. These physical proximity threats 110 may be another mobile computing device, a portable memory storage device, a mobile communications device, or the like, such as CDs and DVDs 170, memory stick 174, flash drive 174, external hard drive, cell phone 178, PDAs 180, MP3 players, digital cameras, point-to-point devices, digital picture frames, digital pens, navigation devices, appliances, and the like. A physical proximity threat 110 may have been previously infiltrated by network threats while connected to an unprotected network connection outside the enterprise facility 102, and when connected to the enterprise facility 102 client facility 144, pose a threat. Because of their mobile nature, physical proximity threats 110 may infiltrate computing resources in any location, such as being physically brought into the enterprise facility 102 site, connected to an enterprise facility 102 client facility 144 while that client facility 144 is mobile, plugged into an unprotected client facility 144 at a secondary location 108, and the like. A mobile device, once connected to an unprotected computer resource, may become a physical proximity threat 110. In embodiments, the end-point computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Now that the overall system has been described, we turn towards a set of behavioral-based protection embodiments. It should be understood that the following embodiments may be managed through a threat management facility 100 along with other services, such as those described herein.

The host intrusion prevention system (HIPS) 200 may be designed to increase the level of specificity of detection, such that detailed remediation can occur and an administrator can relate the malicious behavior back to a specific detailed threat analysis as with existing content analysis systems. Existing behavioral systems are taxed by the requirement to create exceptions and authorizations to managed unwanted detections in an environment—HIPS 200 also serves to eliminate or re-classify (and thus treat with a separate policy workflow more suited to the level of confidence of detection) these less definitive detections enabling administrators to enable the technology with far less disruption and decision making.

Figure 2:
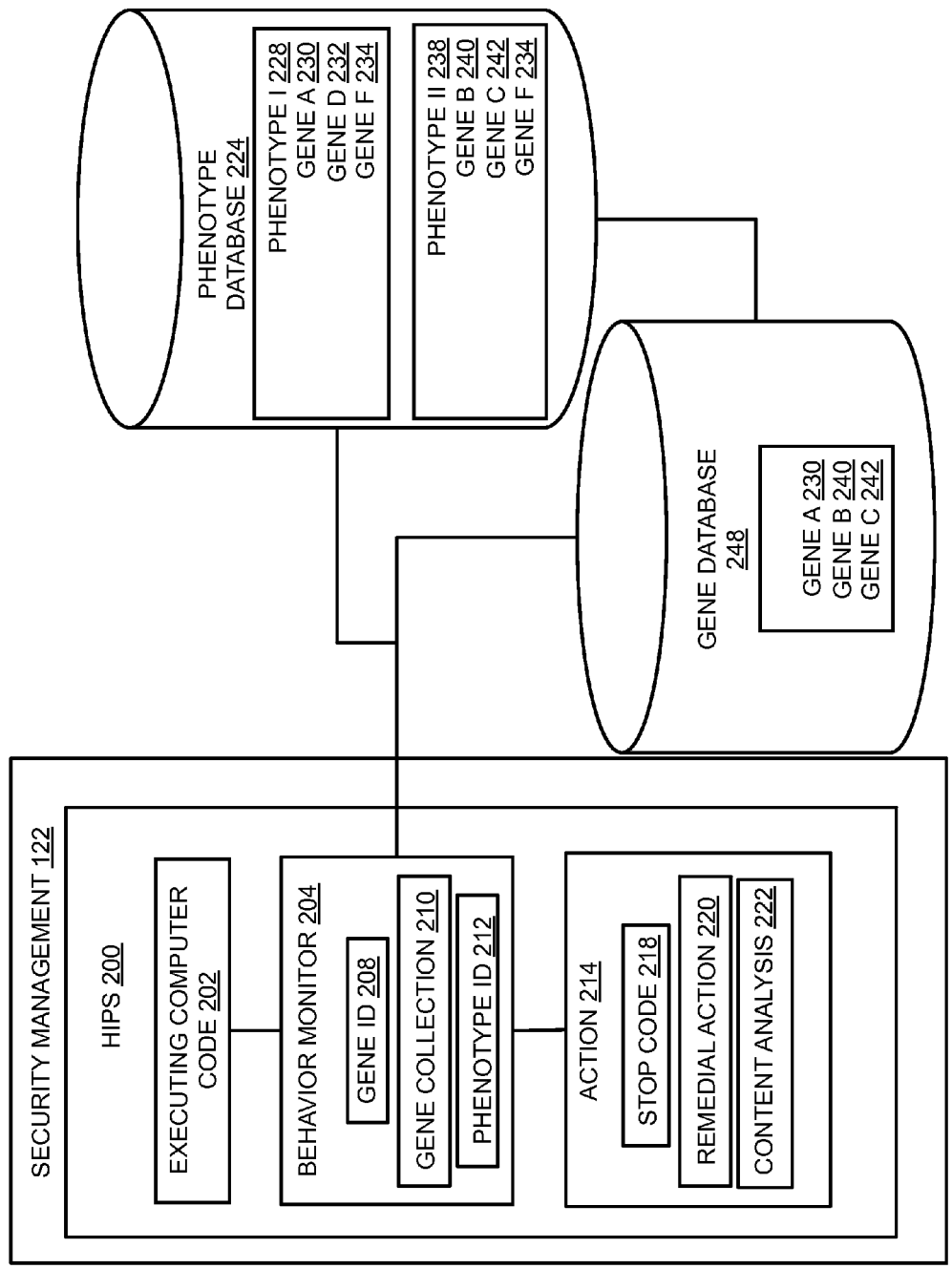
FIG. 2 depicts a block diagram of a security management facility.

Referring to FIG. 2, the security management facility 122 may comprise a host intrusion prevention system 200 which may provide behavioral-based protection through a behavior monitor facility 204. The behavior monitoring facility 204 may guard against unknown threats by analyzing behavior at runtime for executing software code 202. HIPS 200 may enable the assignment and temporary storage of Behavioral Genotype data against processes currently running, in order to construct a sequence of runtime behaviors. Matching this runtime genotype data with known combinations stored in the phenotype database 224, with or without an additional content analysis 222, may enable the identification and interruption of malware while it is executing. By matching combinations of behaviors in this way, detection of malware may be improved over solutions where only singular behaviors and a static content analysis is utilized.

In an embodiment, behaviors may be observed during the execution of code for an indication of malicious behavior. The behavior monitoring facility 204 may monitor the executing code to identify 208 and collect 210 genes as well as identify phenotypes 212. Certain system modifications or behaviors, also known as genes (230-242), may be identified 208 in the executing code. The indication of the malicious behavior may be a result of comparing an operation of the executing code with a predetermined behavior, such as a gene stored for reference in a gene database 248. A plurality of malicious behavior indications may be collected in this fashion by comparing a behavior of an executing code with a predetermined behavior. Genes may continue to be identified progressively over the entire course of a code execution so that at any time during execution, the behavior monitor facility 204 may match an observed phenotype with one stored in a phenotype database 224. Progressive monitoring of behaviors is beneficial as it avoids tricks from malware where they attempt to evade heuristic environments with timing attacks. At some point, if the code is determined to be non-malicious, the behavior monitor facility may discontinue searching for genes.

As genes are identified 208 in the executing process, the genes may be collected 210 into a gene collection and may be associated as a phenotype 228,238 that may include the identified genes or operating processes. For example, in FIG. 2, phenotype I 228 comprises Gene A 230, Gene D 232, and Gene F 234. Likewise, phenotype II 238 comprises Gene B 240, Gene C 242, and Gene F 234. Even though the phenotypes 228, 238 share a common gene, Gene F 234, phenotype identification 212 may be handled on the basis of the phenotype as a whole, so phenotype I 228 may be treated differently from phenotype II 238, both in terms of phenotype identification 212 and post-identification actions 214.

Certain malicious code may be identified via a combination of behaviors, wherein the combination of behaviors is known as a phenotype. A phenotype may be a predetermined collection of malicious behaviors which may include a grouping of specific genes that are typically present in a type or family of malicious code. The behavior monitoring facility 204 may be able to identify a phenotype 212 of behaviors in an executing code by comparing a collection of observed behaviors with the predetermined collections of known malicious behaviors stored as phenotypes in a phenotype database 224, either temporarily or for a longer term. Phenotypes may capture a combination or a series of behaviors that may be ranked to create increasing levels of confidence that the runtime object being monitored is executing a behavior pattern comparable to a known family of malware. The predetermined collections of behaviors, or phenotypes, may be created based on scaled analysis of families of malware in runtime, such as in a threat research facility 132 of a threat management facility 100. Including greater combinations of behaviors in the phenotype database 224 may enable more detailed analysis of a suspicious code. For example, an analysis of a suspicious code may be moved from 'Accessing the registry in this location is bad' to 'This process is exhibiting the same behavior as the family of malware Conficker' based on a comparison of a detected phenotype with an existing phenotype. This more detailed analysis may eliminate many unwanted detections as the probability of a legitimate application attempting to execute a series of bad behaviors is significantly lower. Equally, this more specific detection of the family of malware may enable clean up to be called that can look for other known components of the threat, thus enabling a more comprehensive clean up rather than a simple process killing.

Content analysis 222 may be combined with phenotype identification 212 to enable more detailed content analysis 222 to occur based on triggers, avoiding the need for filtering during threat detection and providing additional context to augment subsequent content analysis 122. For example, an executable could be analyzed and found to be legitimate according to a pragmatic (or realistic) data set balanced for performance. As this threat executes, the tree of chains of bad behaviors would be evaluated and genes set to record the results. These genes may reveal malicious behavior, as they may be part of a phenotype that may be linked to a specific family of malware. The system would then trigger a secondary static analysis where additional content analysis 222 functions would be enabled based on the combination of genes that were previously marked. The type of content analysis that is triggered may be based on the phenotype. For example, a phenotype may predict membership of a process in malware family A and content analysis specific to malware family A is triggered. By combining content analysis 222 with the behavioral-based protection provided by the HIPS 200, a more detailed analysis balancing performance and providing greater detection accuracy may be enabled.

The behavior monitoring facility 204, as well as the HIPS 202, may be software resident on an endpoint. The behavior monitoring facility 204 may monitor executing code and processes, such as access to resources, API calls, registry access, process manipulation, file system access, and the like, in run time by hooking the process and other such resources. Based on the results of the behavior monitor facility 204, if the executing code is deemed to be suspicious or malicious, an action 214 may be caused to occur based on a prediction that the executing code is the type of malicious code as indicated by the phenotype. For example, code execution may be halted 218, a remedial action 220 may be taken, a content analysis 222 may be performed on the executing code or on a file produced by the executing code, the code execution may be paused while content analysis occurs, and the like. A remedial action 220 may be specific to the kind of malicious code, such as the patching of specific exploits that are indicated by the chain of behavior observed. The content analysis may involve at least one of a genotype, a hashing, a partial matching (identifying specific attributes at a known locations in the file or as offsets from identifiers), an emulation, and an interpretation and tokenisation, including lossy refactoring.

In an example, the behavior monitoring facility 204 may monitor behaviors associated with the W32/Sality executable file virus. The behaviors monitored may be: disables OS tools in the registry, disables the MS windows firewall in the registry, adds itself to the firewall authorised applications list in the registry, and injects code into explorer.exe. The behavioral monitoring facility 204 would set runtime genes associated with these behaviors and the phenotype would be the combination of those runtime genes, not necessarily in order. In some phenotypes, the order of observed behaviors could be a part of the identification while in others it would not. If necessary some static genes may also be checked at the same time to further verify that this is actually Sality. The appropriate cleanup routine may then be offered by the HIPS 200 when this phenotype is identified in an executing code.

In another example, the behavior monitoring facility 204 may monitor behaviors associated with the W32/AutoRun worm. The behaviors monitored may be: copies itself to system folder, sets a run key to itself in the registry, sets a second run key to itself in the registry in a different location, disables OS tools in the registry, and opens a hidden file with name Autorun.inf with write access.

Figure 3:
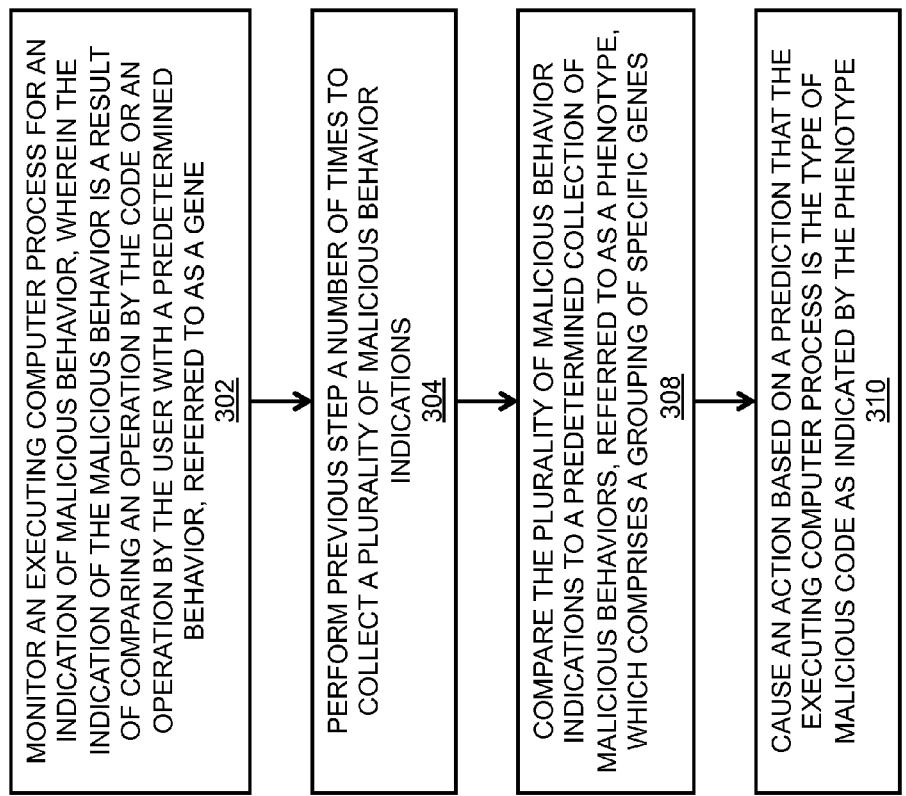
FIG. 3 depicts a flowchart for behavioral-based threat detection.

FIG. 3 depicts a flowchart for behavioral-based threat detection. At step 302, an executing computer process is monitored for an indication of malicious behavior, wherein the indication of the malicious behavior is a result of comparing an operation with a predetermined behavior, referred to as a gene. At step 304, a plurality of malicious behavior indications are collected by performing step 302 a number of times. At step 308, the plurality of malicious behavior indications are compared to a predetermined collection of malicious behaviors, referred to as a phenotype, which comprises a grouping of specific genes that are typically present in a type of malicious code. At step 310, an action is caused based on a prediction that the executing computer process is the type of malicious code as indicated by the phenotype.

In embodiments of the present invention, a behavioral-based host-intrusion prevention method and system may be used for monitoring a user interaction with a computer, software application, operating system, graphic user interface, or some other component or client of a computer network, and performing an action to protect the computer network based at least in part on the user interaction. Such protection may be provided based at least in part by monitoring a user interaction with a computer, and/or computer network client device, during a usage session for an indication of a user behavior and monitoring a computer code process executing during the usage session for an indication of a code operation. The indication of the user behavior may be a result of comparing the user interaction, or plurality of user interactions, with a predetermined behavior (hereinafter, a "behavioral gene"). For example, markers of user behaviors with a computer or client device of a computer network may be monitored, recorded, stored, classified, and/or analyzed based at least in part on the indicia of behavior, and data relating to the behavior, that are created by the user behavior. For example, a user clicking on a link may be detected, recorded, stored, classified, and/or analyzed. Other sample behaviors may include, but are not limited to, a user scrolling down a page, opening or closing a window, clicking on a link on a webpage, downloading a file, saving a file, running a file, typing a keyword, or some other user interaction. For each of the user behaviors occurring within the computer network, or derived from behaviors recorded from interaction with another computer network, a behavioral gene may be stored in a database that is associated with the computer network in which the data relating to the user behavior is recorded and stored. For example, a behavioral gene called "Internet download" may be created and stored in association with the computer network. This behavioral gene may summarize the user behaviors of 1) executing a hyperlink on the Internet, and 2) performing a "save as" action in which a file is saved to a location in the computer network, such as a hard drive. A single user behavior (e.g., closing an application) may be recorded and stored as a behavioral gene. Alternatively, a plurality of user behaviors may be recorded within a single behavioral gene. The user behaviors embodied in a behavioral gene may be derived from a user's single usage session, for example, one instance of running an Internet browser, or may be derived from multiple usage sessions that are temporally distinct, such as a first usage session in which an Internet browser is used, and a second usage session in which a file is opened that was downloaded to the user's hard drive during the first usage session.

In embodiments, the indication of the code operation may be a result of comparing an operation with a predetermined code behavior (hereinafter, a "code gene"). For example, a code gene may be a virus definition, a malware definition, an adware definition, or some other code behavior. The behavioral gene and the code gene may be stored for reference in a database. The monitoring of the computer code process executing during the usage session may be performed one or more times to collect a plurality of code genes. A combination of one or more behavioral genes may be combined with one or more code genes and the combination compared to a predetermined collection of user behavior-code operation indications ("phenotypes"). The phenotypes may comprise a grouping of specific behavioral and code gene combinations that are typically present in a type of malicious usage session or operation with a computer. The identification of a phenotype that is indicative and/or associated with a malicious computer operation may cause an action, such as an intrusion preventive action to occur within the computer network. A phenotype may comprise one behavioral gene and a plurality of code genes, a plurality of behavioral genes and one code gene, or some other combination of behavioral genes and code genes. In some embodiments, a phenotype may comprise a combination of one or more behavioral genes, one or more code genes, including embodiments in which there is a temporal disparity between the identification of the behavioral gene and the identification of the code gene.

In embodiments, the step of causing an action, such as a intrusion prevention action, may include creating an audit record. The creation of an audit record may include updating a log file. In some embodiments, the step of causing an action may include, at least in part, forcing the usage session to occur within a restricted operating environment (e.g. in a sandbox, etc.). In embodiments, the step of causing an action may include, at least in part, preventing a process that would cause a failure, including, but not limited to a computer system failure, a device failure, a network state failure, or some other failure. The step of causing an action may include, at least in part, isolating, via quarantine, the computer on which the user interaction occurs and limiting network access to or from the computer. The step of causing an action may include, at least in part, reverting a computer software state back to a prior state that is known to be acceptable. The step of causing an action may also include, at least in part, disconnecting a device, such as a peripheral, a thumb drive, a zip drive, a disk drive, or some other device.

In embodiments, the user interaction with a computer may include, but is not limited to, executing a link, executing an Internet link, executing an intranet link, downloading a content item from a server, forwarding an URL, forwarding an email, opening an application, closing an application, updating an application, patching an application, bookmarking a website, placing an VoIP call, adding an item to a shopping cart, entering a financial datum in a field, making a purchase, using a webcam, creating an application macro, an application shortcut, entering a novel keystroke combination, remotely accessing a computer, submitting a password, attaching a peripheral device, a temporal measure (e.g., time spent on a page, or time between a first and second user action), a change in a network behavior, a change in a firewall setting, a bridging of two previously unconnected networks, or some other type of user interaction.

In embodiments, a user interaction with a computer may include an indicator of inactivity, such as activation of a screen saver or hibernation process.

In embodiments, a user interaction may occur on a keyboard, a mouse, a display device, a biometric reader, a camera, a scanning device, a printer a telecommunication component, or some other device or client of a computer network. The device or client of the computer network may be remotely associated with the computer network, for example a cell phone that is used to remotely access and interact with the computer network. The methods and systems of the present invention may distinguish between behaviors occurring on remote devices and clients and those behaviors that are occurring on devices local to the computer network, such as wired devices and clients.

In embodiments, indication of a code operation may include, but is not limited to, an automatic code behavior, such as a system startup, login, scheduled job process, system service, or some other type of code operation.

Figure 4:
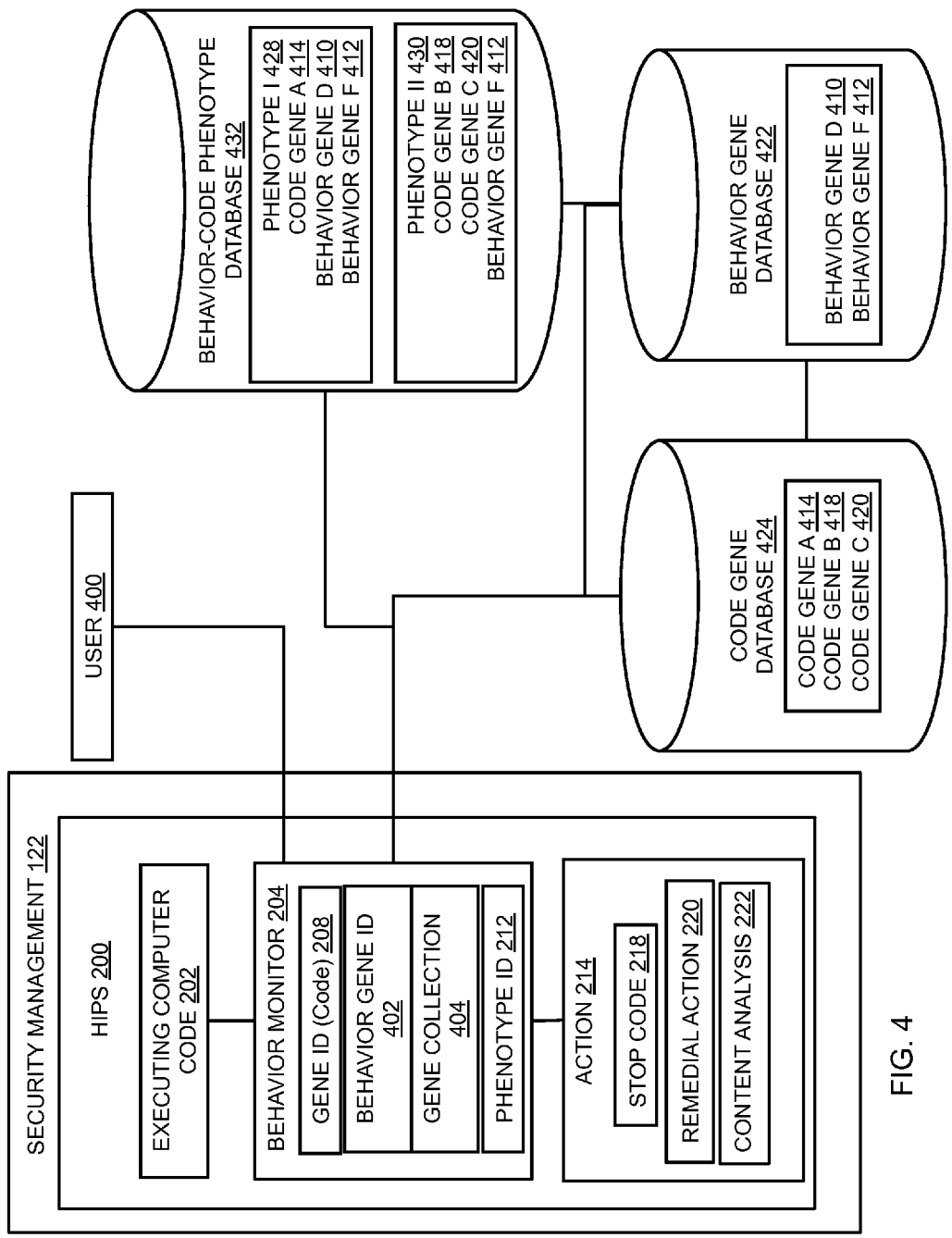
FIG. 4 depicts a block diagram of a security management facility based at least in part on monitoring of behavioral and code genes and associated phenotypes.

Referring to FIG. 4, the security management facility 122 may comprise a host intrusion prevention system 200 which may provide behavioral-, and code-based protection through a behavior monitor facility 204. The behavior monitoring facility 204 may guard against unknown threats by analyzing the behavior of a user 400 and the behavior at runtime for executing software code 202. The HIPS 200 may enable the assignment and temporary storage of code genotype 208 and behavioral genotype 402 data using both user 400 actions and code processes during a usage session, or plurality of usage sessions, in order to construct a phenotype and phenotype match based at least in part on the code gene 208 and behavior gene 402. Matching this genotype data with known combinations stored in a behavior-code phenotype database 432, with or without an additional content analysis 222, may enable the identification and interruption of malware while it is executing. By matching combinations of user behaviors and code behaviors in this way, detection of malware may be improved over solutions where only singular behaviors and a static content analysis is utilized.

In an embodiment, behaviors may be observed during a user's 400 usage session based at least in part on interactions with a computer and/or client device of a computer network, such as interactions with one or more software applications, and the associated execution of code. Behavioral data may be matched to a behavioral gene ID 402 and the execution of code matched to a code gene ID 208, the combination of which may in turn match a behavior-code phenotype that is stored in the behavior-code phenotype database 432. A behavior-code phenotype may indicate the presence of malicious behavior occurring during the usage session and an action, such as an intrusion prevention action, may be taken.

In embodiments, the behavior monitoring facility 204 may monitor user behaviors to identify 402 and collect 404 behavior genes. The behavior monitoring facility 204 may also monitor the executing code to identify and collect code genes. The behavior monitoring facility 204 may also identify phenotypes (428; 430) that are stored in a behavior-code phenotype database. Certain actions taken by a user 400 may be identified as behavior genes (410 and 412) and stored in a behavior gene database 422. Certain system code operations, modifications or code behaviors, also known as code genes (414, 418 and 420), may be identified 208 in the executing code based on code genes (414; 418; 420) that are stored in a code gene database 424.

The indication of suspicious and/or risky user 400 behavior may be a result of comparing one or more user 400 behaviors with a predetermined behavior gene, such as a behavior gene stored for reference in a behavior gene database 422. Such user 400 behaviors may include, but are not limited to changing the registry, executing malicious code, sending sensitive information, and other suspicious or risky behaviors as described elsewhere herein.

The indication of a malicious code behavior may be a result of comparing an operation of the executing code with a predetermined code gene, such as a gene stored for reference in a code gene database 424.

A plurality of malicious user and code behavior indications may be collected in this fashion by comparing a user behavior or a behavior of an executing code with a predetermined behavior. Behavior and code genes may continue to be identified progressively over the entire course of a code execution so that at any time during execution, the behavior monitor facility 204 may match an observed phenotype with one stored in a behavior-code phenotype database 432. Progressive monitoring of user behaviors and code operations is beneficial as may avoid tricks from malware where they attempt to evade heuristic environments with timing attacks. At some point, if the code is determined to be non-malicious, the behavior monitor facility 204 may discontinue searching for genes.

As genes are identified as either behavior genes 402 or code genes 208, the combination of behavior and code genes may be collected 404 into a gene collection and may be associated as a behavior-code phenotype 428,430 that may include the identified behaviors genes and code genes. For example, in FIG. 4, Phenotype I 428 comprises Code Gene A 414, Behavior Gene D 410, and Behavior Gene F 412. Likewise, Phenotype II 430 comprises Code Gene B 418, Code Gene C 420, and Behavior Gene F 412. Even though the phenotypes 428, 430 share a common gene, Behavior Gene F 412, the behavior-code phenotype identification may be handled on the basis of the behavior and gene groupings as a whole. Thus, Phenotype I 428 may be treated differently from Phenotype II 430, both in terms of phenotype identification 212 and post-identification actions 214.

Certain malicious code may be identified via a combination of user behaviors and code behaviors, wherein the combination of behaviors is known as a phenotype. A phenotype may be a predetermined collection of malicious user and code behaviors which may include a grouping of specific behavior and code genes that are typically present in relation to a type or family of malicious code. The behavior monitoring facility 204 may be able to identify a phenotype 212 of user and code behaviors in relation to an executing code by comparing a collection of observed user and code behaviors with the predetermined collections of known malicious user and code behaviors stored as phenotypes in a behavior-code phenotype database 432, either temporarily or for a longer term. Behavior-code phenotypes may capture a combination or a series of user and code behaviors that may be ranked to create increasing levels of confidence that the runtime object being monitored is executing a behavior pattern comparable to a known family of malware. The predetermined collections of behaviors, or phenotypes, may be created based on suspicious or risky user behavior (e.g. downloading a file from a website, running an executable, opening a signed file with an unverifiable digital signature, or other potentially suspicious or risky behavior) and scaled analysis of families of malware in runtime, such as in a threat research facility 132 of a threat management facility 100. Including greater combinations of user and code behaviors in the phenotype database 432 may enable more detailed analysis of a suspicious user behavior or a suspicious code. For example, an analysis of a suspicious code downloaded from a suspicious site by a user may be moved from 'Accessing the registry in this location is bad' to 'This process is exhibiting the same behavior as the family of malware Conficker' based on a comparison of a detected phenotype with an existing phenotype. This more detailed analysis may eliminate many unwanted detections as the probability of a legitimate application attempting to execute a series of bad behaviors is significantly lower. Equally, this more specific detection of the family of malware may enable clean up to be called that can look for other known components of the threat, thus enabling a more comprehensive clean up rather than a simple process killing. Analyzing the user behavior information in connection with the code behavior may provide additional accuracy for determining whether a monitored set of behaviors is either likely legitimate or likely illegitimate. For example, if software code is associated with a user behavior, such as having downloaded that content from the Internet, a remedial action 220 may be taken since the combination, or phenotype, of the code in conjunction with the user's downloading behavior may cause more concern with the code and its potential harm to the computer network.

Content analysis 222 may be combined with phenotype identification 212 to enable more detailed content analysis 222 to occur based on triggers, avoiding the need for filtering during threat detection and providing additional context to augment subsequent content analysis 122. For example, an executable could be analyzed and found to be legitimate according to a pragmatic (or realistic) data set balanced for performance. As this threat executes, the tree of chains of bad user and code behaviors would be evaluated and behavior and code genes set to record the results. These user and code genes may reveal malicious behavior, as they may be part of a phenotype that may be linked to a specific family of malware. The system would then trigger a secondary static analysis where additional content analysis 222 functions would be enabled based on the combination of behavior and code genes that were previously marked. The type of content analysis that is triggered may be based on the phenotype. For example, a phenotype may predict membership of a process in malware family A and content analysis specific to malware family A is triggered. By combining content analysis 222 with the behavioral-based protection provided by the HIPS 200, a more detailed analysis balancing performance and providing greater detection accuracy may be enabled.

The behavior monitoring facility 204, as well as the HIPS 200, may be software resident on an endpoint. The behavior monitoring facility 204 may monitor user behaviors, such as mouse clicks, touchpad movement, keyboard key presses, or other user behaviors. The behavior monitoring facility 204 may also monitor executing code and processes, such as access to resources, API calls, registry access, process manipulation, file system access, and the like, in run time by hooking the process and other such resources. Based on the results of the behavior monitor facility 204, if the executing code is deemed to be suspicious or malicious, an action 214 may be caused to occur based on a prediction that the executing code is the type of malicious code as indicated by the phenotype. For example, a user input may be ignored, a user input may be overridden, code execution may be halted 218, a remedial action 220 may be taken, a content analysis 222 may be performed on the executing code or on a file produced by the executing code, the code execution may be paused while content analysis occurs, and the like. A remedial action 220 may be specific to the kind of malicious code, such as the patching of specific exploits that are indicated by the chain of behavior observed. A remedial action 220 may be specific to the user behavior associated with the malicious code. For example, the remedial action for a user emailing a file infected with a virus may include prompting the user to clean the infected file. The content analysis may involve at least one of a genotype, a hashing, a partial matching (identifying specific attributes at a known locations in the file or as offsets from identifiers), an emulation, and an interpretation and tokenisation, including lossy refactoring.

In an example, the behavior monitoring facility 204 may monitor user behaviors associated with running a virus and code behaviors associated with the W32/Sality executable file virus. The user behavior may be executing an infected file, and the code behaviors monitored may be: disables OS tools in the registry, disables the MS windows firewall in the registry, adds itself to the firewall authorized applications list in the registry, and injects code into explorer.exe. The behavioral monitoring facility 204 would set user genes and code genes associated with these behaviors and the phenotype would be the combination of those user and code genes, not necessarily in order. In some phenotypes, the order of observed behaviors could be a part of the identification while in others it would not. If necessary some static genes may also be checked at the same time to further verify that this is actually Sality. The appropriate cleanup routine may then be offered by the HIPS 200 when this phenotype is identified in an executing code.

In another example, the behavior monitoring facility 204 may monitor user and code behaviors associated with the W32/AutoRun worm. The user behavior monitored may be opening an infected email and the code behaviors monitored may be: copies itself to system folder, sets a run key to itself in the registry, sets a second run key to itself in the registry in a different location, disables OS tools in the registry, and opens a hidden file with name Autorun.inf with write access.

Figure 5:
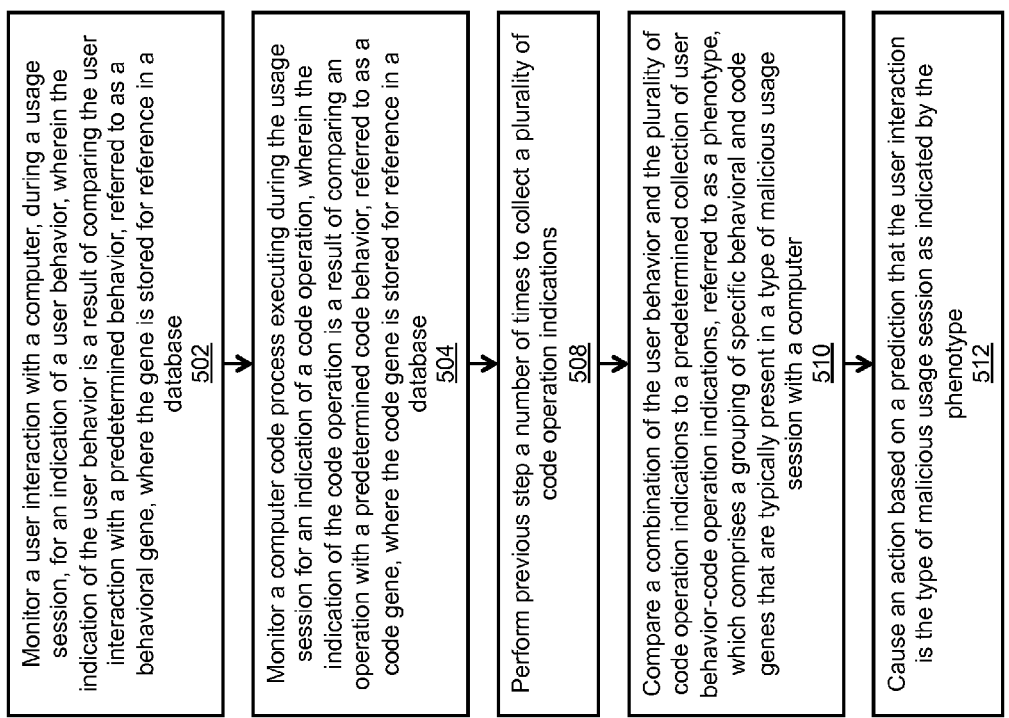
FIG. 5 depicts a flowchart summarizing an embodiment of monitoring user interactions with a computer as part of a security management facility.

FIG. 5 depicts a flowchart for behavioral-based threat detection. At Step 502, a user interaction with a computer, during a usage session, is monitored for an indication of a user behavior, wherein the indication of the user behavior is a result of comparing the user interaction with a predetermined behavior, referred to as a behavioral gene, where the gene is stored for reference in a database. At Step 504 a computer code process executing during the usage session is monitored for an indication of a code operation, wherein the indication of the code operation is a result of comparing an operation with a predetermined code behavior, referred to as a code gene, where the code gene is stored for reference in a database. At Step 508, the previous Step 504 is repeated a number of times to collect a plurality of code operation indications. At Step 510 a combination of the user behavior and the plurality of code operation indications are compared to a predetermined collection of user behavior-code operation indications, referred to as a phenotype, which comprises a grouping of specific behavioral and code genes that are typically present in a type of malicious usage session with a computer. And, at Step 512, an action is caused based at least in part on a prediction that the user interaction is the type of malicious usage session as indicated by the phenotype.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer program product embodied in a non-transitory computer readable medium that, when executing on one or more computers, performs the steps of:

A) monitoring a user interaction with a computer, the user interaction including a plurality of user behaviors by a single user during a usage session, for a first indication of a user behavior, wherein the first indication of the user behavior is a result of comparing the user interaction with one of a plurality of predetermined behaviors, referred to as behavioral genes, where each one of the behavioral genes is stored for reference in a database;

B) monitoring a computer code process executing during the usage session for a first indication of a first code operation, wherein the first indication of the first code operation is a result of comparing the first code operation with one of a plurality of predetermined code behaviors, referred to as code genes, where each one of the code genes is stored for reference in a database;

C) performing step B) a number of times to collect a first plurality of code operation indications;

D) comparing a combination of the first indication of user behavior and the first plurality of code operation indications to a first predetermined collection of user behavior-code operation indications, referred to as a phenotype, which comprises a grouping of specific behavioral and code genes that are typically present in a type of malicious usage session with a computer;

E) based on a detection of a collection of known malicious behaviors in step D), performing the following steps to obtain an increased level of confidence that a known family of malware is present:

E1) monitoring the user interaction for a second indication of a second user behavior, wherein the second indication of the second user behavior is a result of comparing the user interaction with one of the behavioral genes;

E2) monitoring the computer code process executing during the usage session for a second indication of a second code operation, wherein the second indication of the second code operation is a result of comparing the second code operation with one of the code genes;

E3) performing step E2 a second number of times to collect a second plurality of code operation indications;

E4) comparing a second combination of the second user behavior and the second plurality of code operation indications to a second phenotype which comprises a second grouping of specific behavioral and code genes that are typically present in a type of malicious usage session with a computer; and F) causing an action based on a prediction that the user interaction is the type of malicious usage session as indicated by the second phenotype.

2. The computer program product of claim 1, wherein the step of causing an action based on the prediction includes, at least in part, creating an audit record.

3. The computer program product of claim 2, wherein creating the audit record includes updating a log file.

4. The computer program product of claim 1, wherein the step of causing an action based on the prediction includes, at least in part, forcing the usage session to occur within a restricted operating environment.

5. The computer program product of claim 4, wherein the restricted operating environment is a sandbox.

6. The computer program product of claim 1, wherein the step of causing an action based on the prediction includes, at least in part, at least one of preventing a process that would cause a computer system failure, preventing a process that would cause a device failure, preventing a process that would cause a network states failure, reverting a computer software state back to a prior state that is known to be acceptable, device status change, and a change in the status of a peripheral.

7. The computer program product of claim 1, wherein the step of causing an action based on the prediction includes, at least in part, isolating, via quarantine, the computer on which the user interaction occurs and limiting network access to or from the computer.

8. The computer program product of claim 1, wherein the user interaction with a computer includes at least one of executing a link, executing an Internet link, executing an Intranet link, downloading content item from a server, forwarding an URL, forwarding an email, opening an application, closing an application, updating an application, patching an application, bookmarking website, placing a VoIP call, adding an item to shopping cart, entering financial data, making a purchase, using a webcam, creation of an application macro, creation of an application shortcut, a novel keystroke combination, accessing computer remotely, submitting password, a change in the status of a peripheral device or software application, a network route changes, a firewall enable, a firewall disable, a change in a firewall status, a DNS change, a bridging of two previously unconnected networks.

9. The computer program product of claim 1, wherein the user interaction with a computer includes an inactivity indicator.

10. The computer program product of claim 9, wherein the inactivity indicator is activation of at least one of a screen saver and a hibernation process.

11. The computer program product of claim 1, wherein the user interaction with a computer includes a temporal indicator.

12. The computer program product of claim 11, wherein the temporal indicator is at least one of a time amount spent on a page, a time amount spent in an application, and a time amount spent between a first user action and a second user action.

13. The computer program product of claim 1, wherein the user interaction with a computer includes a change in a network behavior.

14. The computer program product of claim 13, wherein the change in the network behavior is at least one of a VPN enable, a VPN disable, a VPN start, and a VPN end.

15. The computer program product of claim 1, wherein the user interaction with a computer occurs at least in part on at least one of a keyboard, a mouse, a display device, a biometric reader, a camera, a storage device, a scanning device, a printer, a telecommunication component.

16. The computer program product of claim 1, wherein the indication of a code operation is an automatic code behavior.

17. The computer program product of claim 16, wherein the automatic code behavior is at least one of a system startup, a login, a scheduled job process, a system service, and a remotely executed example.

18. A computer program product embodied in a non-transitory computer readable medium that, when executing on one or more computers, performs the steps of:

A) monitoring a user interaction with a computer, the user interaction including a plurality of user behaviors by a single user during a usage session, for a first indication of a user behavior, wherein the first indication of the user behavior is a result of comparing the user interaction with one of a plurality of predetermined behaviors, referred to as behavioral genes, where each one of the behavioral genes is stored for reference in a database;

B) monitoring a computer code process executing during the usage session for a first indication of a first code operation, wherein the first indication of the first code operation is a result of comparing the first code operation with one of a plurality of predetermined code behaviors, referred to as code genes, where each one of the code genes is stored for reference in a database;

C) performing step A) a number of times to collect a first plurality of user behavior indications;

D) comparing a combination of the first indication of the first code operation and the first plurality of user behavior indications to a first predetermined collection of code operation-user behavior indications, referred to as a phenotype, which comprises a grouping of specific code and behavioral genes that are typically present in a type of malicious usage session with a computer;

E) based on a detection of a collection of known malicious behaviors in step D), performing the following steps to obtain an increased level of confidence that a known family of malware is present:

E1) monitoring the user interaction for a second indication of a second user behavior, wherein the second indication of the second user behavior is a result of comparing the user interaction with one of the behavioral genes;

E2) monitoring the computer code process executing during the usage session for a second indication of a second code operation, wherein the second indication of the second code operation is a result of comparing the second code operation with one of the code genes;

E3) performing step E1 a second number of times to collect a second plurality of user behavior indications;

E4) comparing a second combination of the second plurality of user behavior indications and the second code operation indication to a second phenotype which comprises a second grouping of specific behavioral and code genes that are typically present in a type of malicious usage session with a computer; and F) causing an action based on a prediction that the user interaction is the type of malicious usage session as indicated by the second phenotype.

19. A computer program product embodied in a non-transitory computer readable medium that, when executing on one or more computers, performs the steps of:

A) monitoring a user interaction with a computer, the user interaction including a plurality of user behaviors by a single user during a usage session, for a first indication of a user behavior, wherein the first indication of the user behavior is a result of comparing the user interaction with one of a plurality of predetermined behaviors, referred to as behavioral genes, where each one of the behavioral genes is stored for reference in a database;

B) storing the first indication of the user behavior with a computer code process relating to the user interaction with the computer during the usage session;

C) monitoring the computer code process relating to the user interaction with the computer during the usage session for a first indication of a first code operation, wherein the first indication of the first code operation is a result of comparing the first code operation with one of a plurality of predetermined code behaviors, referred to as code genes, where each one of the code genes is stored for reference in a database;

D) performing step C) a number of times to collect a first plurality of code operation indications;

E) comparing a combination of the first indication of the user behavior and the first plurality of code operation indications to a predetermined collection of user behavior-code operation indications, referred to as a phenotype, which comprises a grouping of specific behavioral and code genes that are typically present in a type of malicious usage session with a computer;

F) based on a detection of a collection of known malicious behaviors in step E), performing the following steps to obtain an increased level of confidence that a known family of malware is present:

F1) monitoring the user interaction for a second indication of a second user behavior, wherein the second indication of the second user behavior is a result of comparing the user interaction with one of the behavioral genes;

F2) monitoring the computer code process during the usage session for a second indication of a second code operation, wherein the second indication of the second code operation is a result of comparing the second code operation with one of the of code genes;

F3) performing step F2 a second number of times to collect a second plurality of code operation indications;

F4) comparing a second combination of the second user behavior and the second plurality of code operation indications to a second phenotype which comprises a second grouping of specific behavioral and code genes that are typically present in a type of malicious usage session with a computer; and G) causing an action based on a prediction that the user interaction is the type of malicious usage session as indicated by the second phenotype.

\* \* \* \* \*